US010323647B2

(12) United States Patent
Grzeika

(10) Patent No.: US 10,323,647 B2
(45) Date of Patent: Jun. 18, 2019

(54) SELF-TEST METHODS AND SYSTEMS FOR SUBMERSIBLE PUMP SYSTEMS

(71) Applicant: Stancor, L.P., Monroe, CT (US)

(72) Inventor: Mark Grzeika, Thomaston, CT (US)

(73) Assignee: Stancor, L.P., Monroe, CT (US)

( * ) Notice: Subject to any disclaimer, the term of this patent is extended or adjusted under 35 U.S.C. 154(b) by 84 days.

(21) Appl. No.: 15/629,960

(22) Filed: Jun. 22, 2017

(65) Prior Publication Data

US 2017/0370369 A1 Dec. 28, 2017

Related U.S. Application Data

(60) Provisional application No. 62/355,485, filed on Jun. 28, 2016.

(51) Int. Cl.
| | | |
|---|---|---|
| *F04B 51/00* | (2006.01) |
| *F04D 13/12* | (2006.01) |
| *F04D 15/00* | (2006.01) |
| *F04D 27/00* | (2006.01) |
| *G01F 23/30* | (2006.01) |
| *F04B 49/025* | (2006.01) |

(52) U.S. Cl.
CPC .......... *F04D 27/001* (2013.01); *F04B 49/025* (2013.01); *F04B 51/00* (2013.01); *F04D 13/12* (2013.01); *F04D 15/0088* (2013.01); *G01F 23/30* (2013.01)

(58) Field of Classification Search
CPC .... F04D 27/001; F04D 13/12; F04D 15/0088; F04B 49/025; F04B 51/00; G01F 23/30
See application file for complete search history.

(56) References Cited

U.S. PATENT DOCUMENTS

| | | |
|---|---|---|
| 6,203,281 B1 | 3/2001 | Gurega |
| 6,676,382 B2 | 1/2004 | Leighton et al. |
| 7,131,330 B2 | 11/2006 | Gurega |
| 7,728,275 B2 * | 6/2010 | Blanchard ............ G01R 31/041 250/214 SW |
| 2007/0286737 A1 * | 12/2007 | Johnson .................. F04B 51/00 417/36 |
| 2008/0031752 A1 * | 2/2008 | Littwin ............... F04D 15/0072 417/411 |
| 2008/0056911 A1 | 3/2008 | Hanke et al. |
| 2011/0311370 A1 | 12/2011 | Sloss et al. |
| 2014/0119946 A1 | 5/2014 | Boese et al. |

(Continued)

*Primary Examiner* — Ryan D Walsh
(74) *Attorney, Agent, or Firm* — Lipsitz & McAllister, LLC

(57) ABSTRACT

The present invention relates to methods and systems for implementing a self-test for sump system components using two-way communications between a main controller and each of the system components to check system operation and status. The self-test system is designed to remotely or locally test the installation of field wiring, system functionality and performance of equipment located in an elevator pit, a transformer vault, a transformer moat, a confined space or any other pit/ditch/sump. The benefits of this technology are: 1) ensure proper installation, 2) exercise the system that might otherwise be dormant for years, 3) avoid the costs and risks associated with entering a confined space, and 4) create an easy to implement preventative maintenance program.

24 Claims, 15 Drawing Sheets

(56) References Cited

U.S. PATENT DOCUMENTS

| | | | |
|---|---|---|---|
| 2014/0119947 A1* | 5/2014 | Bishop | F04B 17/06 417/14 |
| 2014/0119950 A1 | 5/2014 | Bishop et al. | |
| 2014/0199180 A1* | 7/2014 | Schoendorff | F04B 51/00 417/53 |
| 2015/0143892 A1* | 5/2015 | Cummings | F04D 13/086 73/168 |
| 2015/0292501 A1* | 10/2015 | Knight | F04B 51/00 324/511 |
| 2015/0322951 A1 | 11/2015 | Bishop et al. | |
| 2018/0313903 A1* | 11/2018 | Hindle | G01R 31/44 |

* cited by examiner

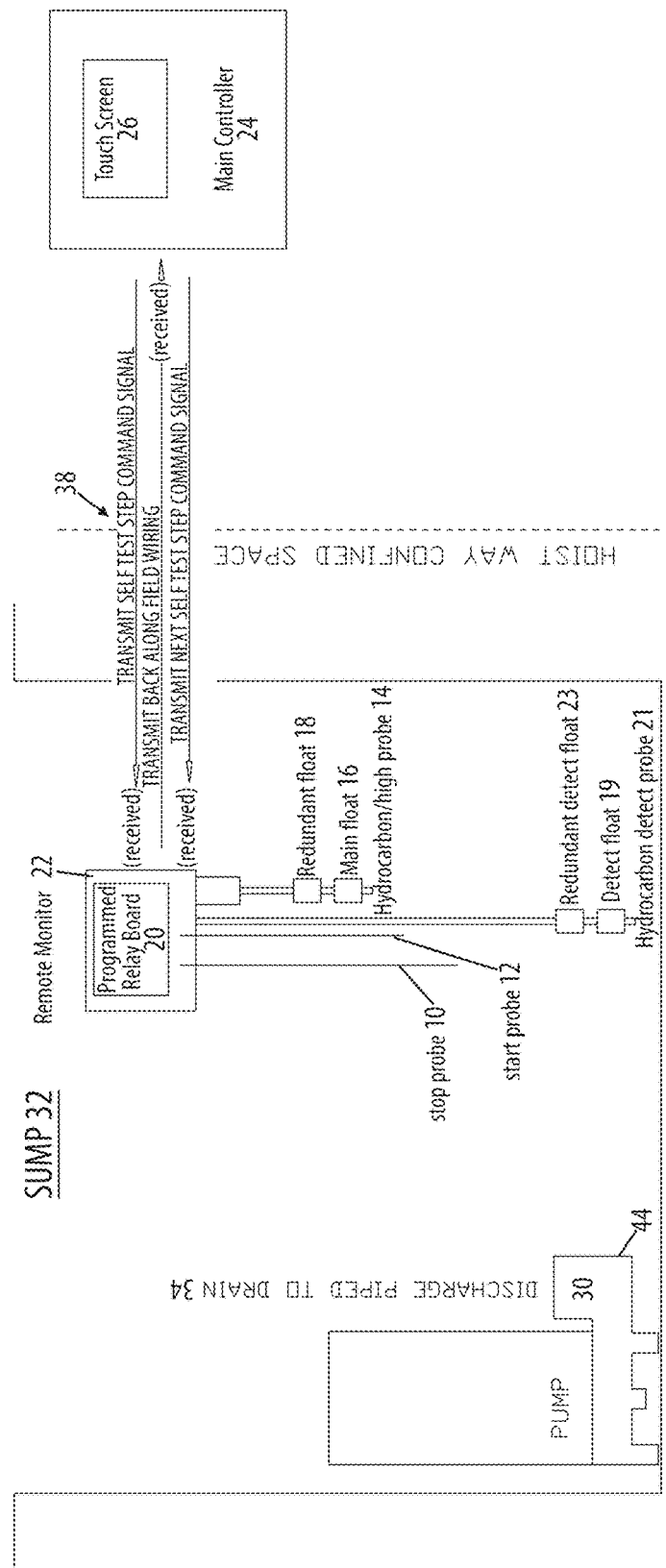

SELF-TEST METHODS AND SYSTEMS FOR SUBMERSIBLE PUMP SYSTEMS

This application claims the benefit of commonly-owned U.S. provisional patent application No. 62/355,485 filed on Jun. 28, 2016, which is incorporated herein and made a part hereof by reference for all purposes.

BACKGROUND OF THE INVENTION

The present invention relates to the field of submersible pumps. More specifically, the present invention relates to self-test methods and systems for testing operation of submersible pump systems.

Submersible pumps are used in a wide variety of applications to remove water or other liquids (such as hydrocarbons or other contaminants) from sumps, ditches, pits or the like. Typical applications include use in elevator pits, transformer vaults, transformer moats, or other confined spaces.

One such prior art submersible pump, developed by Stancor, L. P., the owner of the present invention, is disclosed in U.S. Pat. No. 6,203,281 entitled Submersible Pump Controller for Differentiating Fluids (the '281 patent). The pump disclosed in the '281 patent employs a conductivity probe via which it can be determined whether oil or water is present in the sump (as oil and other hydrocarbons are nonconductive). If oil is detected, it can be pumped to an isolated containment chamber; while if water is detected, it can be pumped out to ground surface or a sewer drain.

With submersible pumps in general, and in particular with submersible pumps used in applications where hydrocarbons or other contaminants may be present, it is critical to ensure proper installation of the pump and proper continued operation subsequent to installation. However, as such pumps are typically installed in closed chambers and/or underground, it is difficult, time consuming, and dangerous to gain access to the pumps and related components (e.g., floats, probes, related wiring and electronics, and the like).

It would be advantageous to enable remote testing of the pump system, including pump(s), floats, probes, field wiring and circuitry, overall system functionality, and system performance of equipment located in a sump or other difficult to access location. It would be advantageous to enable remote testing of the system subsequent to installation to ensure proper installation and proper continued operation, and to remotely exercise pump systems that may otherwise remain dormant for extended periods of time. It would also be advantageous to enable such testing and operation while at the same time avoiding the costs and risks associated with entering confined spaces where such equipment is located, and to easily and safely carry out preventive maintenance programs.

The methods, apparatus, and systems of the present invention provide the foregoing and other advantages.

SUMMARY OF THE INVENTION

The present invention relates to self-test methods and systems for submersible pump systems.

The self-test is designed to remotely test all components of a pump system, including pumps, start, stop and high-water probes, floats, and all pump circuitry, wiring and controls. For example, the self-test may be used with a dual pump system that is adapted to distinguish between and separately pump water and hydrocarbons from the same pit, sump, or other enclosure. However, the present invention can also be adapted for use with a water-only pump system and/or other systems which employ only a single pump.

In one example embodiment of the present invention, upon remote initiation of a self-test, it is first determined whether the pump(s) are running. If the pump(s) are running, the test will not commence or will be delayed until the pump(s) are no longer running. If the pumps are not running, the test will commence. In a dual pump system, the self-test may comprise seven steps after initiation occurs:

1) Hydrocarbon pump running test #1: the hydrocarbon pump is turned on to assure it is operational and to pump any and all liquids from the tank into a containment chamber. The pump is run until a dry running condition is sensed, or for a predetermined period of time;
2) Activate start and stop probes: these probes are activated to ensure signal clarity between an internal relay board and main controller;
3) Activate high and hydrocarbon probe: this probe is activated to ensure signal clarity between the internal relay board and main controller;
4) Checking a primary float: the float logic is scanned, initiating the sending of a signal to determine continuity of float circuitry;
5) Checking a secondary/redundant float: the float logic is scanned, initiating the sending of a signal to determine continuity of float circuitry;
6) Hydrocarbon pump running test #2: the hydrocarbon pump is turned on again to run until a dry running condition is sensed or for a predetermined period of time (which may be less than a time period for step 1 above), to ensure it is safe to engage water pump; and
7) Water pump running test: the water pump is turned on to assure it is operational.

An example embodiment of a self-test method for remote testing of a sump pump system may comprise remotely activating a first pump a first time to ensure the first pump is operational. If the first pump is operational, then start and stop probes may be activated remotely to determine continuity between an internal relay board and a main controller. If the start and stop probes are functioning normally, a high-level probe may be remotely activated to determine continuity between the internal relay board and the main controller. If the high-level probe is functioning normally, circuitry of a primary float may be remotely checked to determine continuity between the primary float and the main controller. If the primary float circuitry is functioning normally, circuitry of a redundant float which is positioned above the primary float may be remotely checked to determine continuity between the redundant float and the main controller. If the circuitry of the redundant float is functioning normally, the first pump may be activated a second time to ensure it is safe to activate a second pump. Then the second pump can be remotely activated to assure the second pump is operational.

During normal operation of the pump system, the start and stop probes control operation of the second pump. In addition, the high-level probe in connection with the primary float or the redundant float enable a determination of a presence of a non-conductive liquid for initiating operation of the first pump during normal operation.

The method may also comprise, prior to initiating the self-test, checking whether the pump system is currently in normal operation or in an alarm state. If the pump system is currently in normal operation or in an alarm state, aborting the self-test or delaying the self-test until the pump system is no longer in normal operation or in the alarm state.

The first pump may be for pumping non-conductive fluids and the second pump may be for pumping conductive fluids. The non-conductive fluids may comprise at least one of a hydrocarbon based fluid, a hydraulic fluid, oil, gas, diesel fuel or the like, including any non-conductive fluid that floats on and separates from water.

The first pump may be routed to a containment chamber and the second pump may be routed to a surface drain.

The start probe, the stop probe, and the high-level probe may each comprise a conductivity probe.

When the first pump is activated the first time or the second time, any liquid present in the sump may be pumped to an external storage container. A liquid level of the external storage container may be monitored and an alert may be issued once the liquid level reaches a predetermined level. The first pump may not be activated in the event that the liquid level of the external storage container is at the predetermined level. Further, the first pump may be shut off if the predetermined level is reached during activation of the first pump.

The first pump may be run until at least one of a dry running condition is sensed via a current sensor and a predetermined time period has elapsed.

The start probe, the stop probe, and the high-level probe may each be activated by closing corresponding relays, resulting in a generation of a corresponding signal. The corresponding signal may be sent to the main controller. In the event that the corresponding signal does not reach the main controller or predetermined signal conditions for the corresponding signal are not met, the self-test may be aborted.

In an unactivated state, corresponding contacts in the circuitry of the primary float and in the circuitry of the redundant float may be in the closed position. In such an embodiment, the circuitry of the primary float and the circuitry of the redundant float are each checked by sending a signal through the corresponding contacts resulting in generation of a corresponding signal. The corresponding signal may be sent to the main controller. In the event that the corresponding signal does not reach the main controller or predetermined signal conditions for the corresponding signal are not met, the self-test may be aborted.

When the second pump is activated, the second pump is run until at least one of a dry running condition is sensed via a current sensor and a predetermined time period has elapsed. For example, in the embodiment where the second pump is run until a dry running condition is sensed, due to the activation of the first pump the first and second times, in the event that a dry running condition is not immediately sensed, the second pump is shut off and an alert is generated.

A remote monitor may be provided which comprises the internal relay board, the circuitry for the primary float, the circuitry for the redundant float, and circuitry for the start probe, the stop probe, and the high-level probe. In such an example embodiment, each of the activating or checking steps, if completed within acceptable parameters, results in a corresponding handshake between the remote monitor and the main controller. The self-test may be aborted and an alert may be generated in the event that any of the activating or checking steps does not result in the corresponding handshake.

The remote monitor may be located within the sump or adjacent to the sump. The main controller may be located at a location remote from the sump. The remote monitor may be in wired or wireless communication with the main controller.

The self-test may be initiated via a user interface of the main controller or a user interface generated by a mobile application running on a portable user device which enables communication between the main controller and the portable user device. The user interface enables control and monitoring of the self-test and control and monitoring of normal pump system operation.

The user interface may comprise a touch screen display comprising one or more of the following menu items or displays: pump status; pump controls; pump run count; pump data; pump elapsed time; oil containment status; oil containment configuration; self-test; alarm history; active alarms; real-time pump current values; and the like.

The self-test may be initiated at one of predetermined intervals or one or more scheduled dates and times. The predetermined intervals may comprise one of a predetermined time interval or a predetermined number of pump runtime hours.

An example embodiment of a system for remote self-testing of a sump pump system in accordance with the present invention comprises a main controller for the pump system and a remote monitor in or adjacent to the sump in communication with the main controller. The remote monitor comprises an internal relay board and circuitry for pump system components. A user interface for the main controller is provided for operating the pump system and initiating execution of software for carrying out the self-test of the pump system, as described above in connection with the corresponding method.

The system may also include any of the features or functionality of the method embodiments discussed above.

As discussed above, the self-test may also be modified for use in a single pump or simplex system. In an example embodiment of a self-test for a simplex system in accordance with the present invention, the self-test may begin by remotely activating a pump a first time to ensure operation. If the pump is operational, start and stop probes may be remotely activated to determine continuity between an internal relay board and a main controller. If the start and stop probes are functioning properly, a high-level probe may be activated to determine continuity between the internal relay board and the main controller. Provided the high-level probe is functioning properly, circuitry of a primary float may be remotely checked to determine continuity between the primary float and the main controller. If the primary float circuitry is functioning properly, circuitry of a redundant float positioned above the primary float may be remotely checked to determine continuity between the redundant float and the main controller.

The method may also comprise, prior to initiating the self-test, determining whether a non-conductive liquid is present at a bottom of the sump. If a non-conductive liquid is determined to be present, the self-test may be aborted.

The steps of the self-test for the simplex embodiment may be carried out in the same manner as the corresponding steps of the dual pump embodiment discussed above. Certain features and functionality of the dual pump embodiment discussed above are also applicable to the simplex system. Corresponding systems are also provided.

BRIEF DESCRIPTION OF THE DRAWINGS

The present invention will hereinafter be described in conjunction with the appended drawing figures, wherein like reference numerals denote like elements, and:

FIG. 15 shows a block diagram of a further example embodiment of the present invention.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods and systems for implementing a self-test for a pump system and its individual components using two-way communications between a main controller and each of the system components to check system operation and status. The self-test system is designed to remotely test the installation of field wiring, system functionality, and performance of equipment located in an elevator pit, a transformer vault, a transformer moat, a confined space, or any other pit/ditch/sump containing water and/or hydrocarbon (or other contaminants). The benefits of this technology are to: 1) ensure proper installation, 2) exercise the system that might otherwise be dormant for years, and 3) avoid the costs and risks associated with entering a confined space, and 4) create an easy to implement preventative maintenance program.

Figure 1:
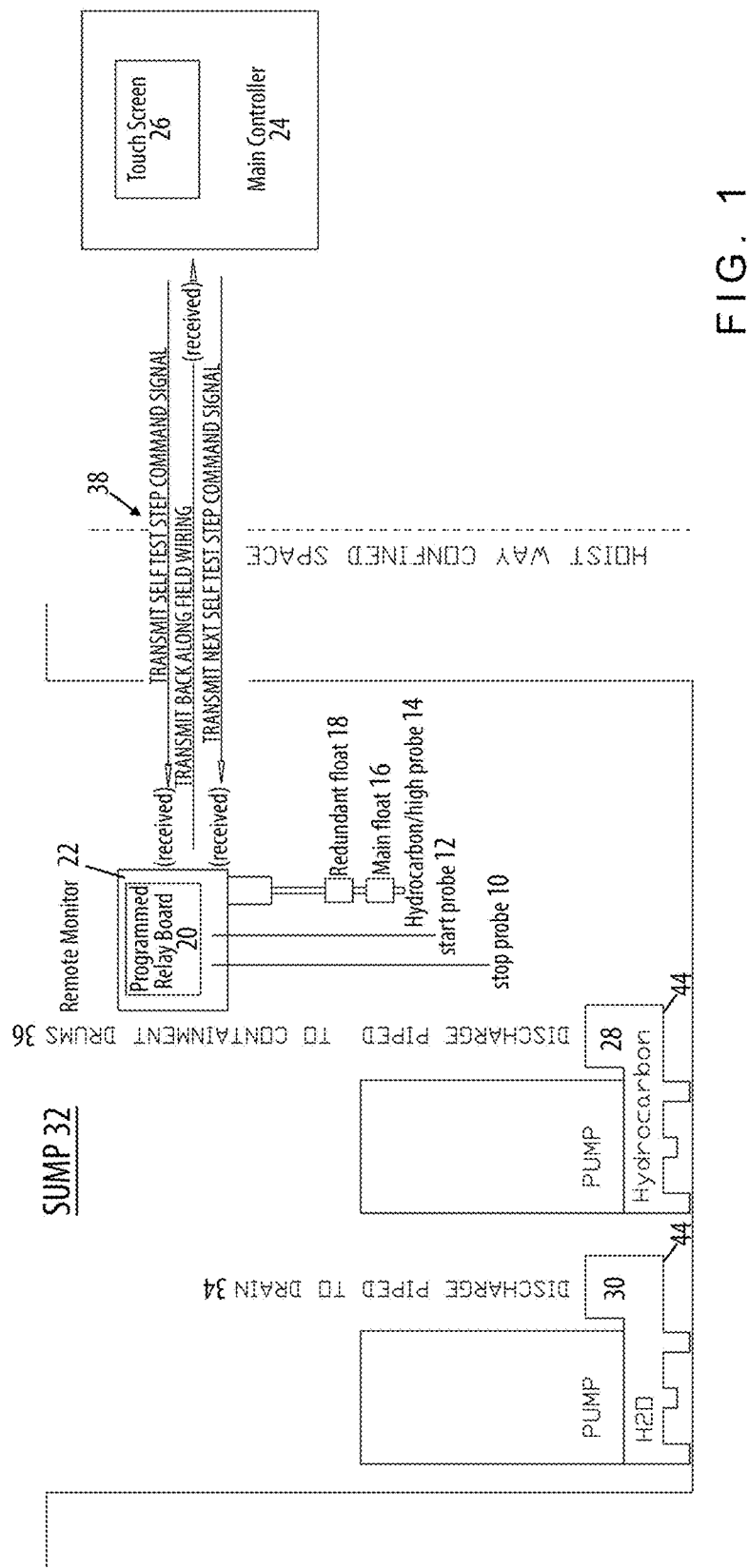
FIG. 1 shows a block diagram of an example embodiment of the present invention.
Figure 2:
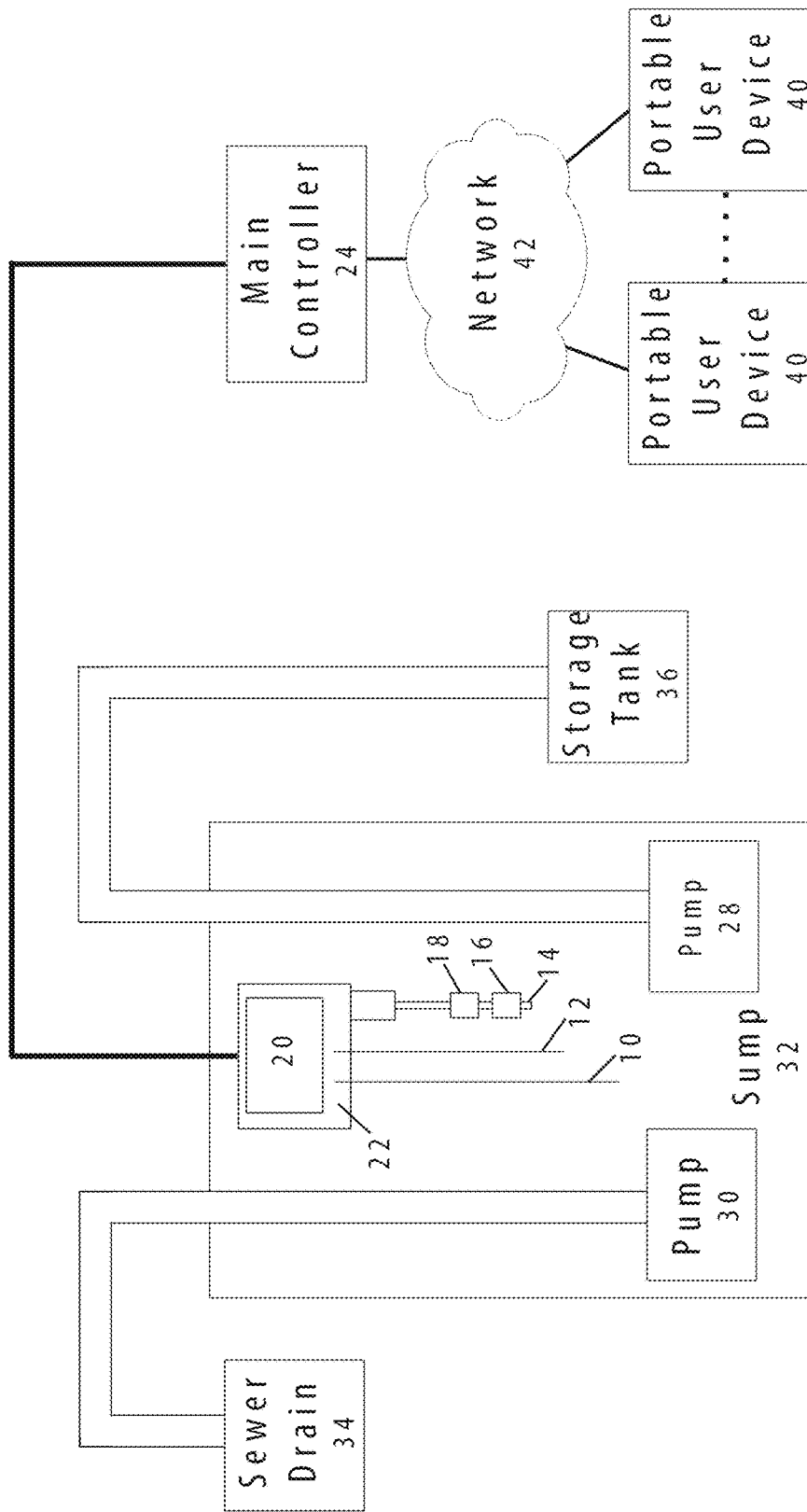
FIG. 2 shows a system block diagram of an example embodiment of the present invention.

An example embodiment of such a pump system is shown in FIGS. 1 and 2, and includes three level probes/sensors 10, 12, and 14, two level float sensors (one main float 16 and one redundant float 18 for safety in the event the main float 16 fails to operate) and a proprietary programmable relay board 20 (also referred to herein as "internal relay board"). All probe sensors, float sensors, and the relay board, including all related circuitry, may be integrated to create a remote monitor 22. The remote monitor 22 communicates with a main controller 24 (with touch screen/user interface 26) and separate pumps 28 and 30 for hydrocarbon and water separation. Two level sensors/probes are used to monitor the liquid level (e.g., a stop probe 10 and a start probe 12). A third level sensor/probe 14 is used to detect high water level and in conjunction with the level float sensors 16 and 18 is used to discern between a non-conductive fluid (e.g., such as hydrocarbon) and air. The two level float sensors may include a main float 16 and a redundant float 18. The redundant float 18 may be separately wired from and positioned at a level above the main float 16. The main float 16 may be positioned above the level of the high level/hydrocarbon sensing probe 14. The remote monitor 22 is in communication with the probes 10, 12, 14 and floats 16, 18, as well as in communication with the main controller 24 and the pumps 28, 30. The remote monitor 22, in conjunction with the main controller 24, will determine the logic state of the sensors and floats and control and monitor the operation of each pump. Each component of the system may be periodically (at the request of the operator or at preset self-testing intervals) prompted for information based on a more complex subsystem of componentry.

The system shown in FIG. 1 employs two separate pumps 28 and 30 to (1) eliminate unwanted water from elevator sumps, garages, transformer vaults, and other areas while (2) preventing the unwanted discharge of hydrocarbon to the environment. The probes 10, 12, 14 may comprise conductivity probes. When water collects in the sump 32, and conductivity is present between the pumps' electrically conductive parts (e.g. the pump frame 44, pump housing, and/or other conductive portion of the pump) and the stop/start probes 10 and 12, the water service pump 30 will discharge water until the level is below the corresponding stop probe 10. If the water level increases to the highest probe 14, a high water alarm will engage. In the event of a hydrocarbon leak, the spilled hydrocarbon will collect in the sump 32 and float to the surface of the water (if present). If the combined liquid level in the sump (hydrocarbon and/or water) is high enough such that the liquid level triggers the start probe 12 without there being sufficient hydrocarbon layer thickness to trigger the main float 16, the system will pump water continuously until the level falls below the stop probe 10 via a dedicated water pump 30. Pumping will stop once the water level falls below the stop probe 10. As in such a case there is not a sufficiently thick hydrocarbon layer present to trigger the main float 16, no hydrocarbons will be pumped out by the water pump 30. However, the hydrocarbon pump 28 will be triggered when the liquid level is high enough to trip the main float 16 (or trip the redundant float 18 if the main float 16 fails) and the hydrocarbon layer is thick enough such that no conductivity is present between the pump's electrically conductive parts, start probe 12, and high/hydrocarbon probe 14. Triggering of the hydrocarbon pump 28 will result in all liquid (hydrocarbon and any water that may be present) being pumped out of the sump 32 until a dry running condition is sensed by a current sensor or for a predetermined time period (e.g., set via a watchdog timer for the pump 28). The water pump 30 may be routed to an external drain 34 and the hydrocarbon pump 28 may be routed to a separate waste hydrocarbon storage tank 36.

During normal operation, if the redundant float is tripped for any reason (typically via the accumulation of hydrocarbons above the level of the main float 16 in the event of failure of the main float 16), the main controller 24 will recognize that the redundant float 18 has been triggered and issue an alarm indicating a failure of the main float 16. This is carried out via logic circuitry at the main controller 24 that recognizes that the main float 16 should have activated since it is physically below the location of the redundant float 18.

With the present invention, all system elements (e.g., pumps, floats, cables and wires, probes, relays, indicators, switches, current transformers, power supply, contactors, electronic boards, disconnects and circuit breakers, and the like) will be regularly tested and monitored to improve maintenance practices and working condition by identifying connectivity issues and problems with system functionality. The results of self-testing (component and system performance) may then be displayed on a touch screen 26 (also referred to herein as "user interface") of the main controller 24.

When the self-test function is initiated, via a user interface such as the touch screen 26 of the main controller 24 (or a remote application to be described in detail below), a sequential routine begins that energizes a proprietary, programmed step-relay board 20 that controls logic settings and/or main controller inputs, enabling activation (or in some cases changing logic states to resemble activation) of each system component. At each stage, a corresponding step signal is transmitted through field wiring 38 from the relay board 20 to the main controller 24. If the transmitted signal meets specifications set within programmed software as determined by the main controller 24 for the particular component or step of the test, then a handshake (e.g., a signal exchange) occurs between the main controller 24 and remote monitor 22 relating to the system component subject to the current step of the self-test. The next step is then initiated by the main controller 24. A failure to meet specification for a particular step or component would stop the test sequence, provide a visual indication/alarm (e.g., red) on the touch screen 26, and provide a reference number for trouble shooting.

By proceeding through the testing steps in a specific order, it can be assured that the components located in the sump 32 (or at least their circuitry in the case of the floats 16, 18) are operational. In addition, by requiring the sending of a signal from the relay board 20 to the main controller 24 and the resultant handshake, the self-test also ensures that the circuitry in the internal relay board 20 is operational, that there is continuity in the wiring 38 between the internal relay board 20 and the main controller 24, and that the main controller 24 is functioning properly.

Note that although FIG. 1 shows the remote monitor 22 connected to the probes, floats, and pumps, and located in the sump or pit 32, it should be appreciated that the present invention is not so limited. The remote monitor 22 may be mounted inside or outside the sump/pit 32 (e.g. directly above or adjacent the pit with extended probes). In addition, the remote monitor 22 may be integrated into the main controller 24 and connected to the probes, floats and pumps via a wired or wireless connection. For example, the remote monitor 22 may be integrated in or located in the same building or room as the main controller 24, and communicate wirelessly (e.g., over the Internet or other network, including but not limited to WAN, LAN, Bluetooth, RF, or cellular networks) with the probes, floats and pumps via a wireless access point external to the sump 32, which wireless access point may be hardwired to the system components and/or be directly connected to extensions of the probes and floats. In embodiments where the remote monitor 22 is separate from the main controller 24, it may communicate therewith via either wired or wireless connections.

In one example embodiment for testing the pump system shown in FIG. 1, the self-test logic of the present invention contains seven steps. Prior to initiating the self-test, a check is made to determine whether the pumps 28, 30 are in operation and whether the system is in an alarm state. If the system is in operation or in an alarm state, the self-test is aborted or delayed. If the system is not in operation and is not in an alarm state, the self-test is initiated. The self-test may be remotely initiated, for example from the main controller 24 or an application running on a portable user device 40 (e.g. a smart phone or other portable computer device) in communication with the main controller 24 and/or the remote monitor 22 of the pump system via a network 42, as shown in FIG. 2.

The first step may comprise a first hydrocarbon pump running test. In this step, the hydrocarbon pump 28 is remotely activated to assure it is operational and to ensure the remainder of the test is carried out on a dry system (e.g., so that all liquids are pumped out of the sump 32 to the extent possible). The hydrocarbon pump 28 is routed to a separate hydrocarbon container or storage tank 36. In the event there is static oil in the sump 32, the oil, along with any other liquids present in the sump 32, is pumped to the separate storage tank 36. A level of this storage tank 36 may be monitored and an alarm will be triggered once the level of the container 36 reaches a predetermined level. The self-test will not activate if there is an alarm condition indicating the storage tank 36 is at the predetermined level, or the test will be interrupted if this level is reached during the running of the hydrocarbon pump 28 in this first step. In this first step, the hydrocarbon pump 28 may be run until a dry condition is reached, which may be sensed using a current sensor which is adapted to determine whether the pump is running under load or not (e.g., an approximate current draw of "X" amps indicates the pump is not under load (i.e., running dry), while "Y" amps indicates the pump is under load). The current sensor may be implemented in software running on the main controller 24 (see, e.g., FIG. 9). As this pump 28 is activated during the test (whether or not oil is present in the sump and run until dry), water (as well as oil) may be pumped into the storage tank 36. In addition, in the embodiment where the pump 28 is configured to run until dry, a watchdog timer may be implemented so that the pump 28 can be turned off if a dry pumping condition is not sensed within a predetermined time period. The watchdog timer may be implemented via software running on the main controller 24 (see, e.g., FIG. 4). If the watchdog timer is tripped, the self-test may be aborted, as a problem with the hydrocarbon pump 28 or the pump system may be indicated. In an alternate embodiment, the pump 28 may be run for a predetermined time period during this step. This embodiment may also employ a current sensor which may switch off the pump 28 if a dry pumping condition is sensed prior to the end of the predetermined time period. If a dry condition is not sensed prior to the expiration of the predetermined time period, the test may be aborted, an alarm may be triggered and a problem with the pump 28 or system may be indicated.

The second step assumes the sump 32 is empty and may comprise activation of the start probe 12 and the stop probe 10 to determine continuity and signal clarity between the internal relay board 20 of the remote monitor 22 and the main controller 24 for the pump system. As the probes 10, 12 sense continuity between a reference ground (e.g., the frame 44 of the pumps 28, 30 or other common ground used by the pumps 28, 30) a signal is generated by the internal relay board 20, simulating a water level reading. The resultant signal(s) may be transmitted to the main controller 24, and checked to determine if predetermined specifications are met. If so, a handshake (signal exchange) then occurs between each of the start and stop probes 10, 12 and the main controller 24. If a signal is not transmitted, or the specifications are not met, then the test failed and an alarm condition is indicated.

In a third step, the high water/hydrocarbon probe 14 is activated to determine continuity and signal clarity between the internal relay board 20 and main controller 24. This step is carried out the same way as discussed above with regard to the activation of the start and stop probes 10, 12.

In a fourth step, the main float circuitry (contained within the internal relay board 20) is checked to measure operation of the float circuitry of the main float 16 to detect liquid level. In a normal, unactivated state of the float 16, the contacts in the float circuit are closed. During the test, a signal is sent through the closed contacts of the float circuitry to the main controller 24, to initiate a handshake between the float 16 and the main controller 24. If no signal is received, or the signal is not within predefined parameters, the test is failed and an alarm condition is indicated. As the float 16 itself cannot be operated remotely (e.g., raised and lowered), this check determines whether there are any continuity problems between the float 16 and the main controller 24 (e.g., with regard to signal clarity or circuit continuity).

In a fifth step, the redundant float circuitry is checked to measure operation of the float circuitry to detect liquid level, to ensure continuity of the circuitry of the redundant float 18. This test is carried out in the same manner as that for the main float 16 discussed above.

In a sixth step, the hydrocarbon pump 28 is activated for a second time. In this step, the hydrocarbon pump 28 is turned on again and run to a dry condition (by sensing current as discussed above in connection with the first step). If the dry condition is not immediately sensed (or sensed within a very short time period as determined by the watchdog timer), this indicates that liquids have entered the sump 32 since the first step of the test (indicating a leak or other problem in the sump) and the test will be aborted and a message will be generated to reinitiate the self-test at a later date. Once the hydrocarbon pump 28 is run for the second time and a no load condition has been indicated (e.g., a dry running condition is indicated by the current sensor), it can be assumed that all liquids have been removed from the sump 32 and it is safe to activate the water pump 30 in the next step. The activation of the hydrocarbon pump the second time ensures that there is no liquid present that would be pumped by the water pump 30 during the next step of the test, as the water pump 30 will pump any fluids to the surface or a sewer drain 34 (rather than a separate containment tank 36 as with hydrocarbons). Optionally, if in the first step an immediate dry running condition is sensed, the second activation of the hydrocarbon pump 30 in this sixth step may be omitted (since an immediate dry running of the pump in the first step indicates no fluid present in the sump 32 and the pump 28 is in working order, there is little chance of fluid accumulation in the sump 32 in the short amount of time needed to run the intervening steps of the self-test). In this manner, wear and tear on the pump 28 from further dry running may be prevented.

In a seventh step, the water pump 30 may be activated. In this step, the water pump 30 is turned on to ensure it is operational. The water pump 30 may be run for a predetermined time during this step or until a dry pumping condition is detected (as discussed above in connection with the hydrocarbon pump 28). Since the hydrocarbon pump 28 was previously run until a dry running condition was detected, there should be no liquid present in the sump 32 at this seventh step, and so the dry running condition of the water pump 30 should be sensed almost immediately. A watchdog timer may also be initiated in this step which will shut off the pump 30 if a dry running condition is not detected within a predetermined time period. A failed or abort condition may be triggered based on the current level readings, indicating a problem with the pump 30 or pump system.

The seven steps may be carried out in the specific sequence indicated above. However, it should be appreciated that the order of at least certain steps may be changed, as long as the hydrocarbon pump 28 is activated at least once prior to activating the water pump 30 (e.g., the first and optionally sixth steps described above must in all cases be carried out before the seventh step described above, to avoid the pumping of hydrocarbons by the water pump 30).

Certain steps may also be omitted during the running of a self-test. For example, the self-test can be run only on the pumps 28, 30, only on the floats 16, 18, and/or only on the probes 10, 12, 14 (or any select combination thereof). Omitting steps may be useful when a quick check of a particular system component is desired, or for example exercising the pump(s) 28, 30 periodically without running a complete self-test. Also, it should be appreciated that the self-test can be modified to work with different types and configurations of pump systems. For example, certain steps may be omitted where the pump system under test contains less components than described above (e.g. there is no need to test a redundant float when one is not present in the system under test). Similarly, steps may be added similar to those described above where more system components are present (e.g., another pump running test can be added where a backup pump is present).

Within each step of the self-test, a specific routine may be initiated with a specific expected outcome. For example:

In the first step described above, a contactor in the remote monitor 22 for the hydrocarbon pump 28 may be energized, motor current may be measured during pump operation, and a watchdog timer may be initiated.

In the second and third steps described above, relays in the remote monitor 22 may be closed to ensure the probes are functioning properly.

In the fourth step described above, relays in the remote monitor 22 may be closed, initiating the sending of a signal to determine continuity of float circuitry.

In the fifth step described above, relays in the remote monitor 22 may be closed, initiating the sending of a signal to determine continuity of float circuitry.

In the sixth step described above, a contactor in the main controller 24 for the hydrocarbon pump 28 may be energized, motor current may be measured, and a watchdog timer may be initiated.

In the seventh step described above, a contactor in the main controller 24 for the water pump 30 may be energized, motor current may be measured, and a watchdog timer may be initiated.

Each step, if properly initiated and completed, results in generation of a signal exchange or handshake between the remote monitor 22 and the main controller 24. At any stage, if the handshake is not completed, or not completed within predefined parameters, the test may be aborted and a failure message may be generated and displayed on the touch screen 26. The alarm may comprise a colored warning text (e.g., red) on the display 26, an audible alarm such as a single, periodic, or continuous beep or other noise, and/or a text alert to a user's mobile device 40, or the like.

The self-test may be automatically initiated at predefined intervals or at scheduled dates and times. The interval may correspond to a time interval or a predetermined number of pump runtime hours. The self-test may also be initiated on user command via the main controller 24 or a software application running on a portable user device 40, as discussed in detail below.

Although the self-test embodiments described herein refer to a hydrocarbon pump 28 and a water pump 30, those skilled in the art will appreciate that the hydrocarbon pump may comprise a first pump for pumping a first type of liquid and the water pump may comprise a second pump for pumping a second type of liquid. For example, the first type of liquid may be any non-conductive liquid (e.g., a hydrocarbon based fluid, a hydraulic fluid, oil, gas, diesel fuel, and the like, including any non-conductive liquid that floats on and separates from water) and the second type of liquid may be a conductive liquid (e.g., water, water-based solutions, and the like). Further, it should be appreciated that the use of the terms "oil" and "hydrocarbon" as used herein and in the drawings are interchangeable.

Figure 3:
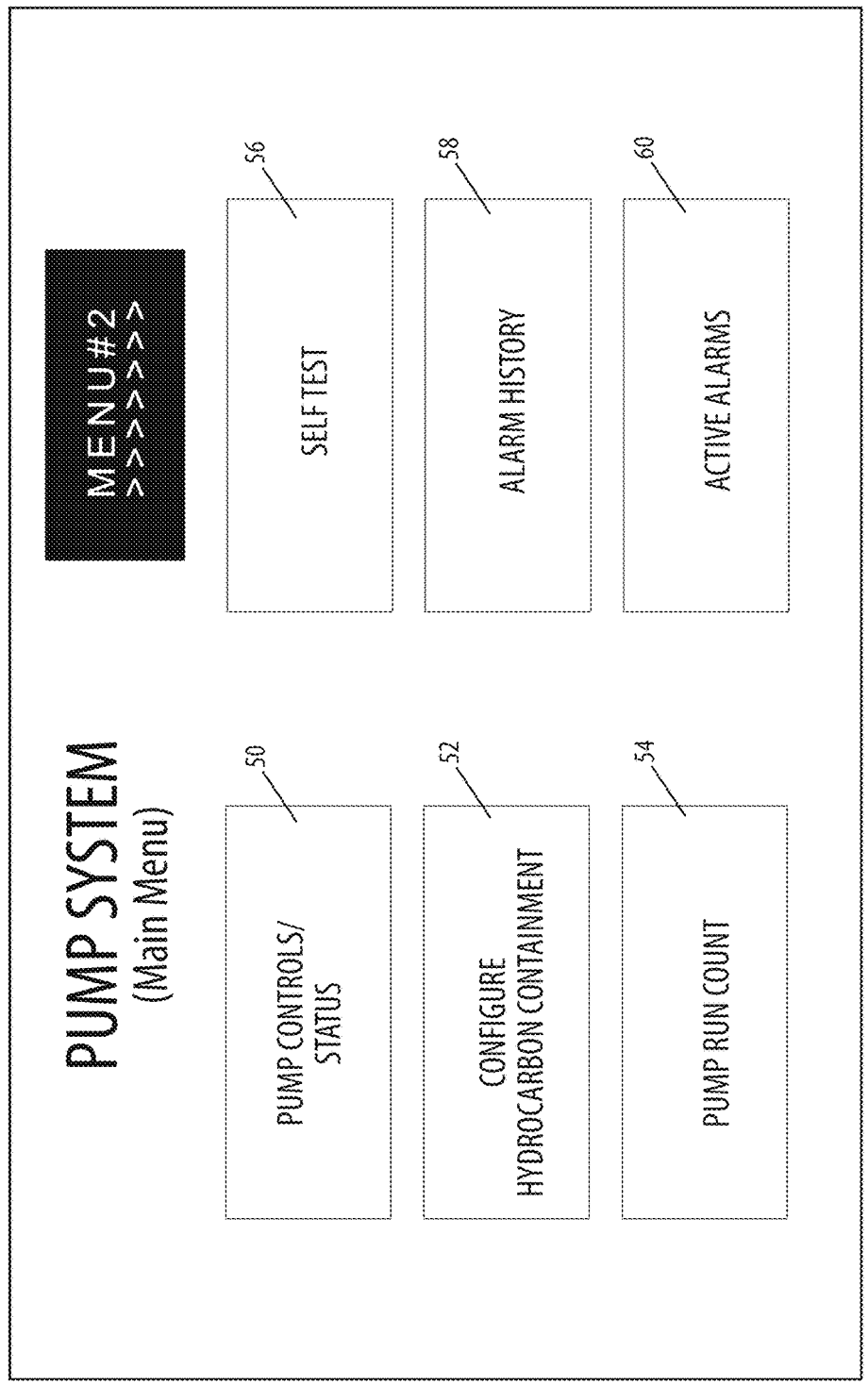
FIGS. 3-14 show screen shots from an example embodiment of a main controller touch screen.
Figure 4:
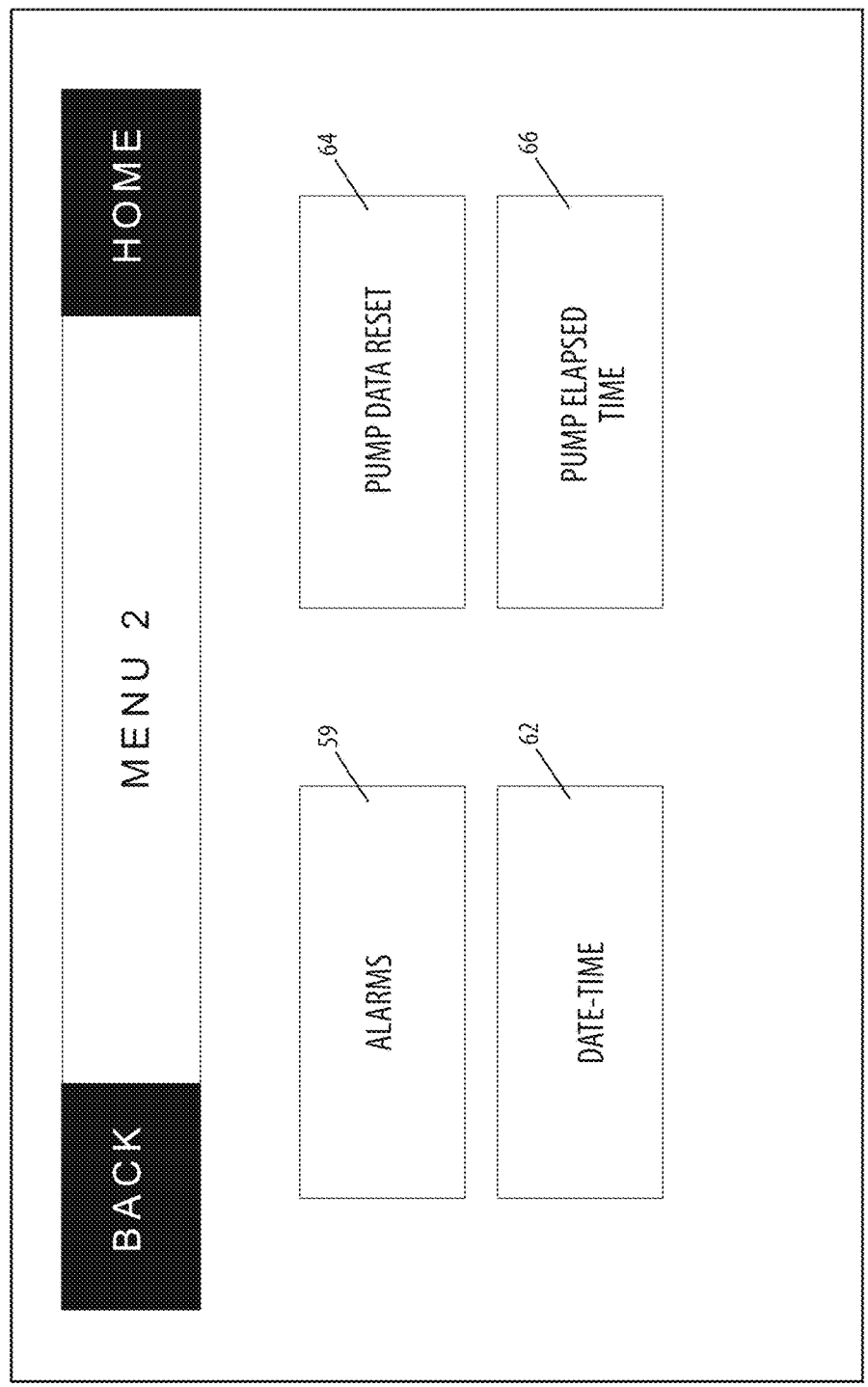
Figure 5:
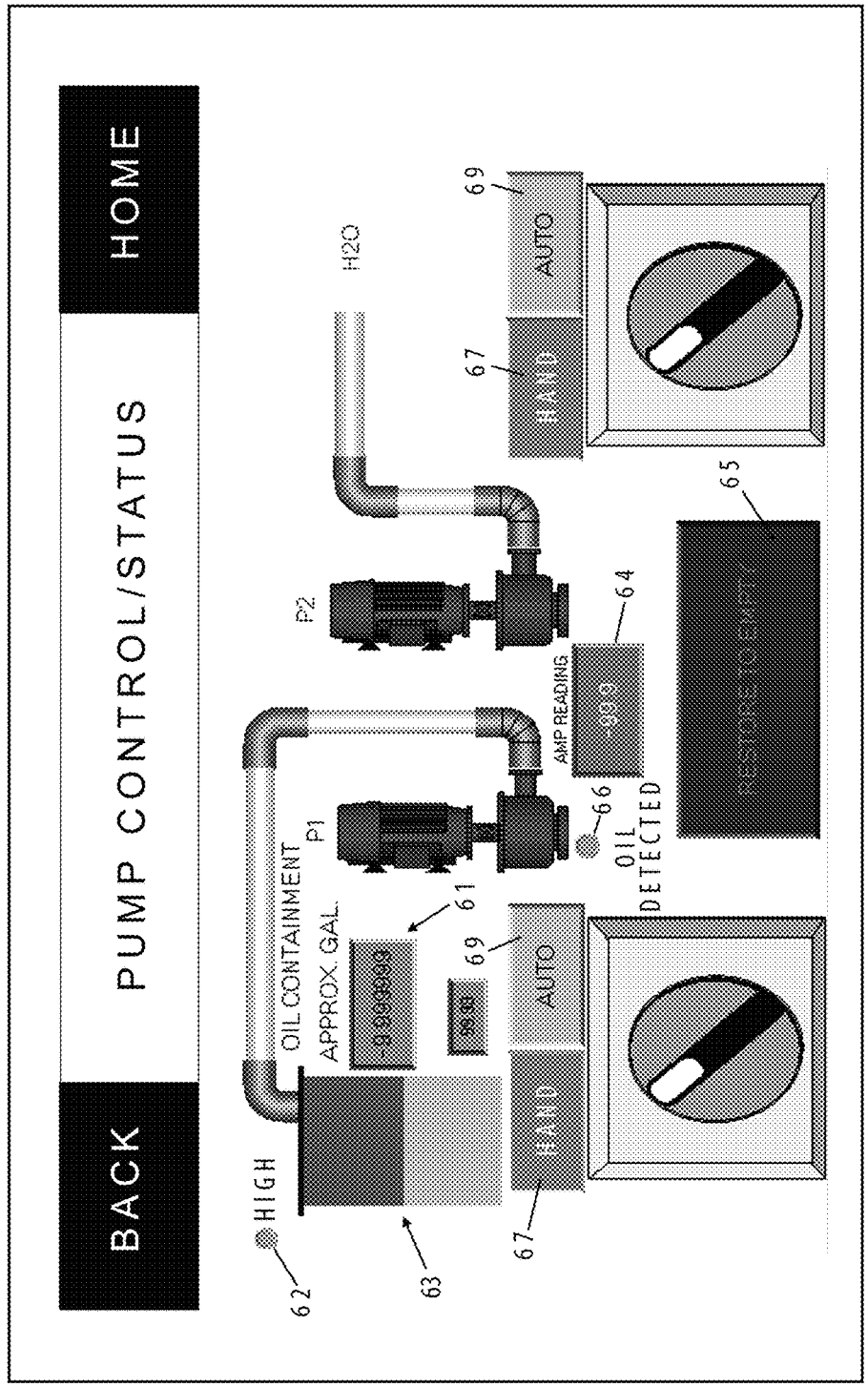

FIG. 3 is an example screenshot of the main controller touch screen 26 showing the main menu items. FIG. 4 is an example screenshot of a second page of the main controller touch screen main menu. As shown in FIGS. 3 and 4, the touch screen 26 of the main controller 24 may contain several menu items and/or displays, including but not limited to the following:

1) Pump controls/status 50, the selection of which renders a screen which provides an update on active pumps, pump motor amperage levels, and hydrocarbon levels. FIG. 5 is an example screenshot of the main controller touch screen showing pump controls and status when the pump controls/status 50 menu item is selected. FIG. 5 shows storage tank level 61 and a representation 63 of the storage tank 36 showing the current liquid level of the storage tank 36, a high-level alert 62 for the storage tank 36, the pump current draw 64 of the pump currently in operation, and an indicator 66 of whether hydrocarbon is detected. The liquid level of the storage tank is computed based on the known gallons per minute flow rate of the pump and the pump run time. The fill level of the storage tank 36 is represented by color filling the representation 63 of the tank in FIG. 5. A restore to empty option 65 enables manually resetting of the representation 63 of the tank to empty. In addition, the controls provided by the screen shown in FIG. 5 enable manual running of the hydrocarbon pump or water pump. In particular, a hand operated option 67 or an auto operated option 69 is provided for each pump. The hand operated option 67 may require constant contact for continued running of the pump, with a release or lack of touch of the hand option button 67 resulting in the pump(s) reverting to automatic operation.

Figure 6:
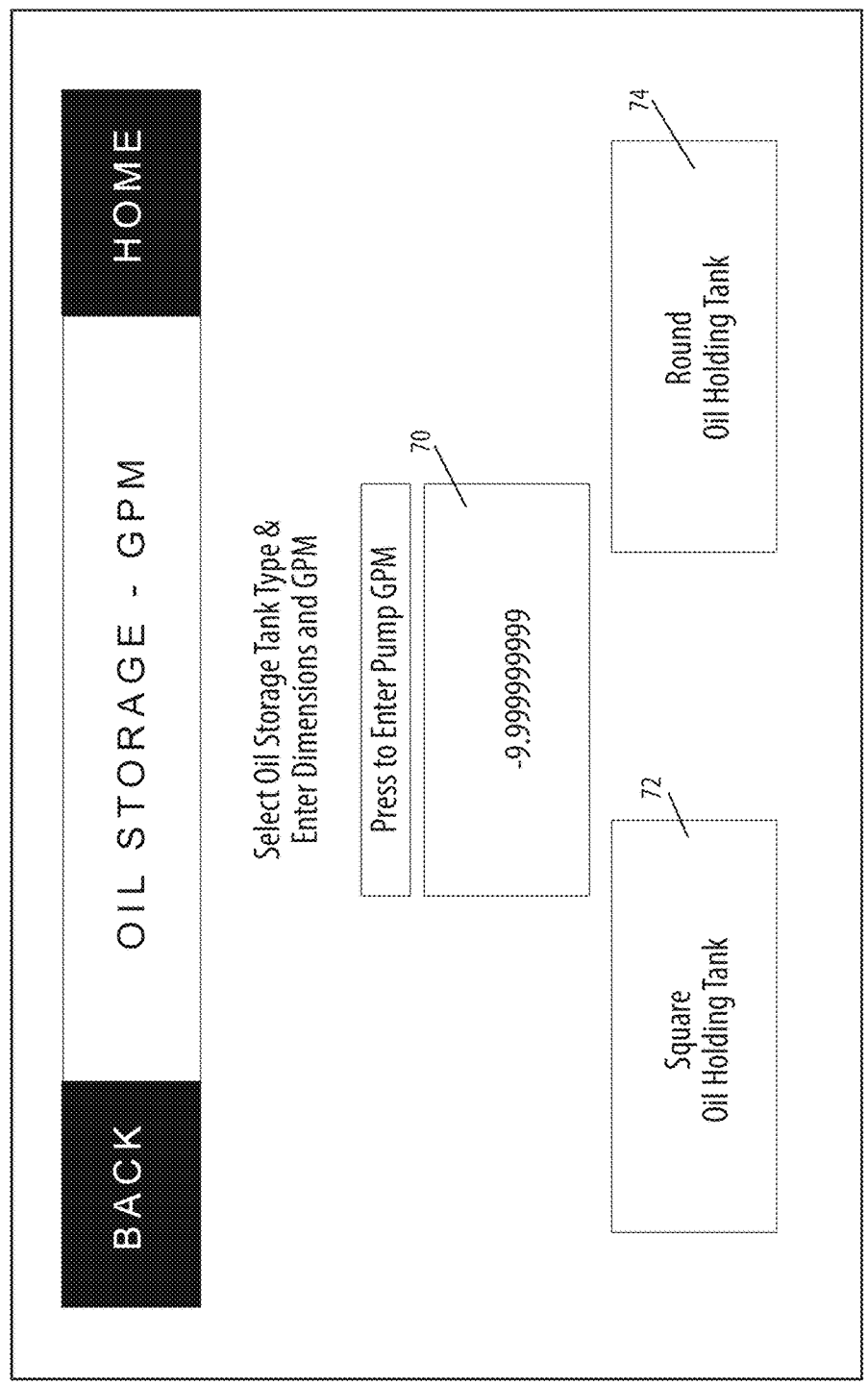
Figure 7:
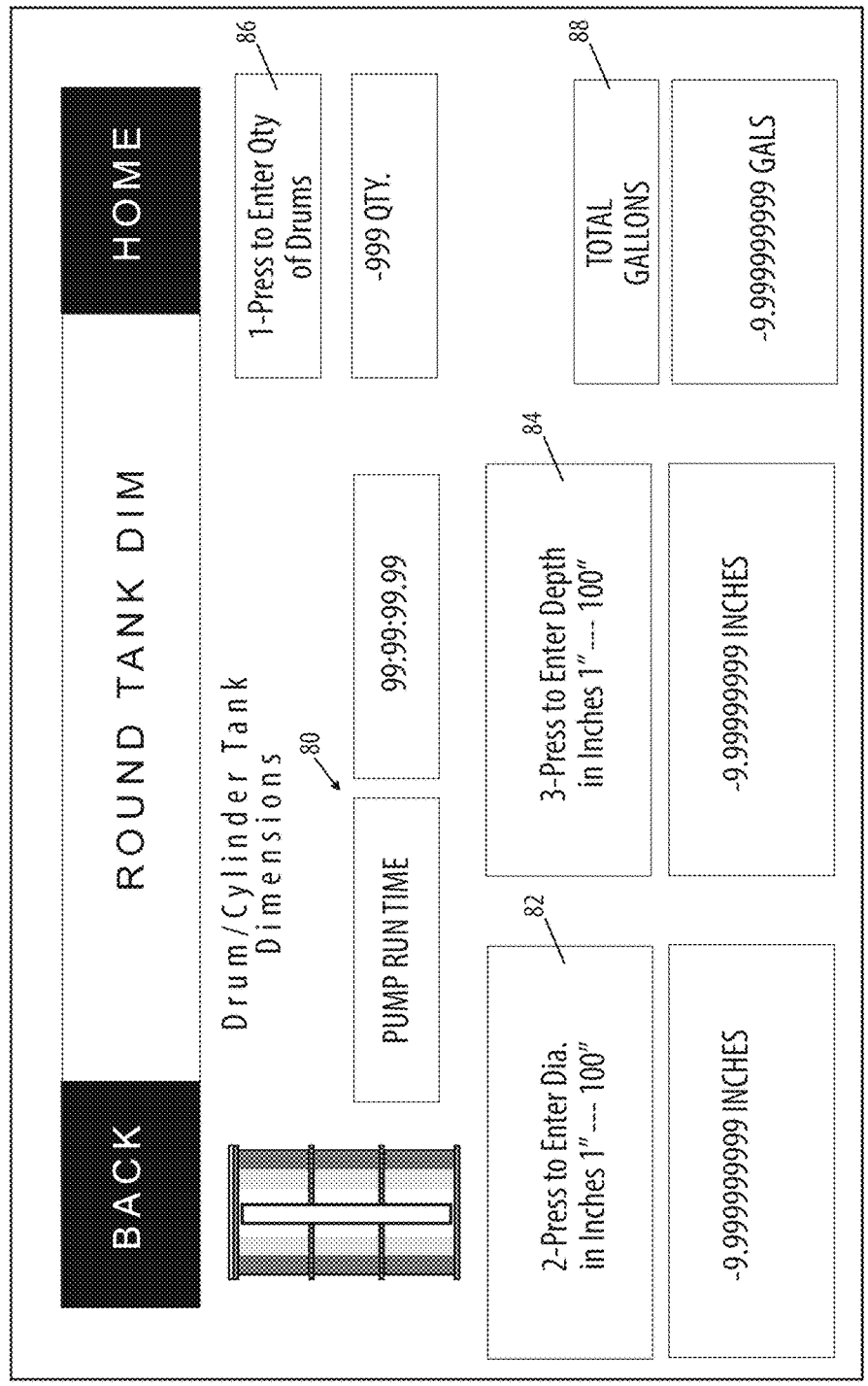

2) Configure hydrocarbon containment 52, which when selected brings the user to a screen which enables configuration of the hydrocarbon storage tank 36 to establish capacity and track fill level. FIG. 6 is an example screenshot of the main controller touch screen 26 showing hydrocarbon storage tank configuration options, including pump capacity 70, square tank option 72, and round tank option 74; FIG. 7 is an example screenshot of the main controller touch screen 26 showing configuration options once a round tank is selected in FIG. 6, including a pump run time indicator 80, tank diameter entry 82, tank depth entry 84, number of drums 86 (more than one drum or storage tank 36 may be provided), and total gallons 88. Similar configuration options (e.g., dimensions and capacity, etc.) may be provided in the event the square tank option 72 is selected.

Figure 8:
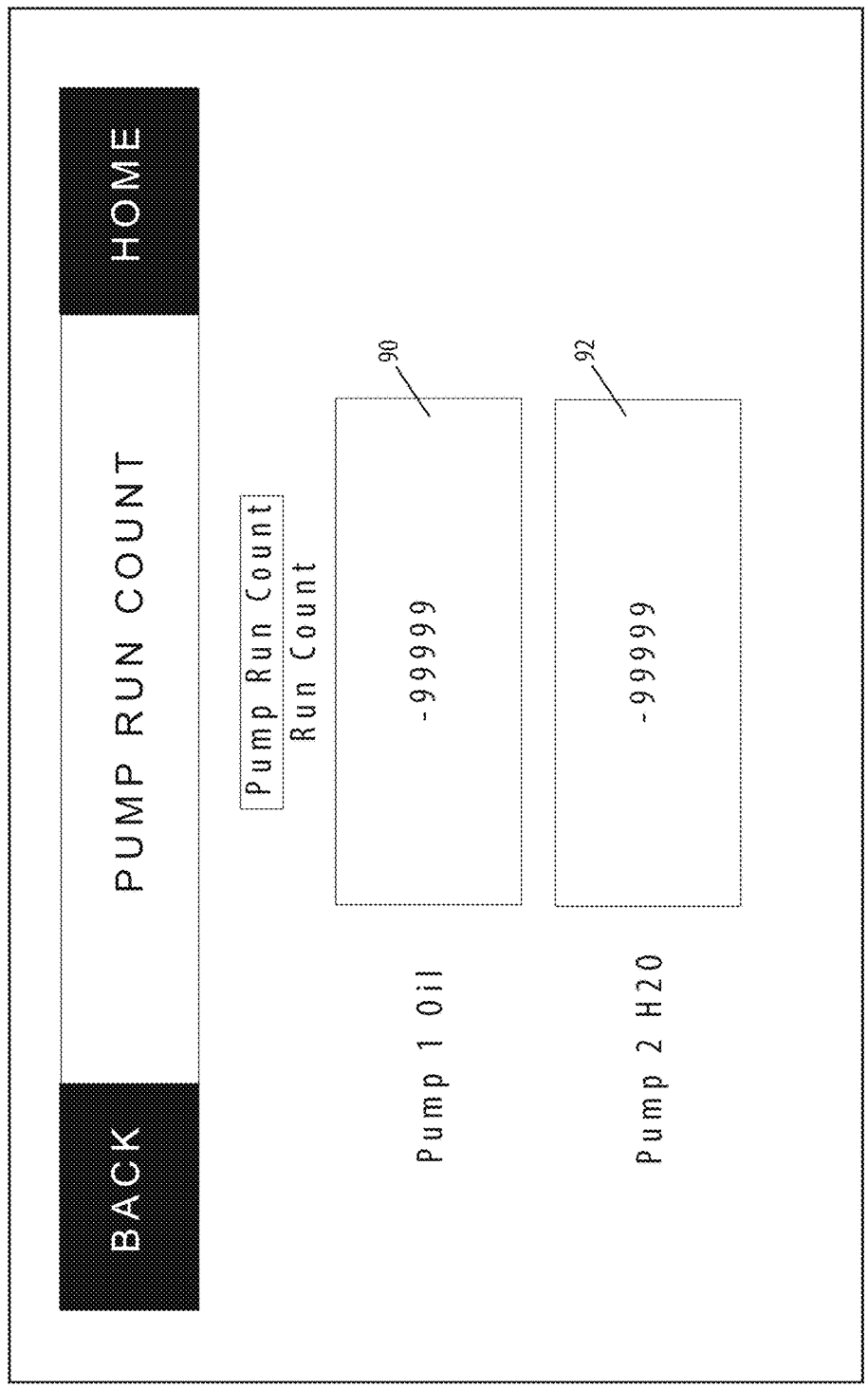
Figure 9:
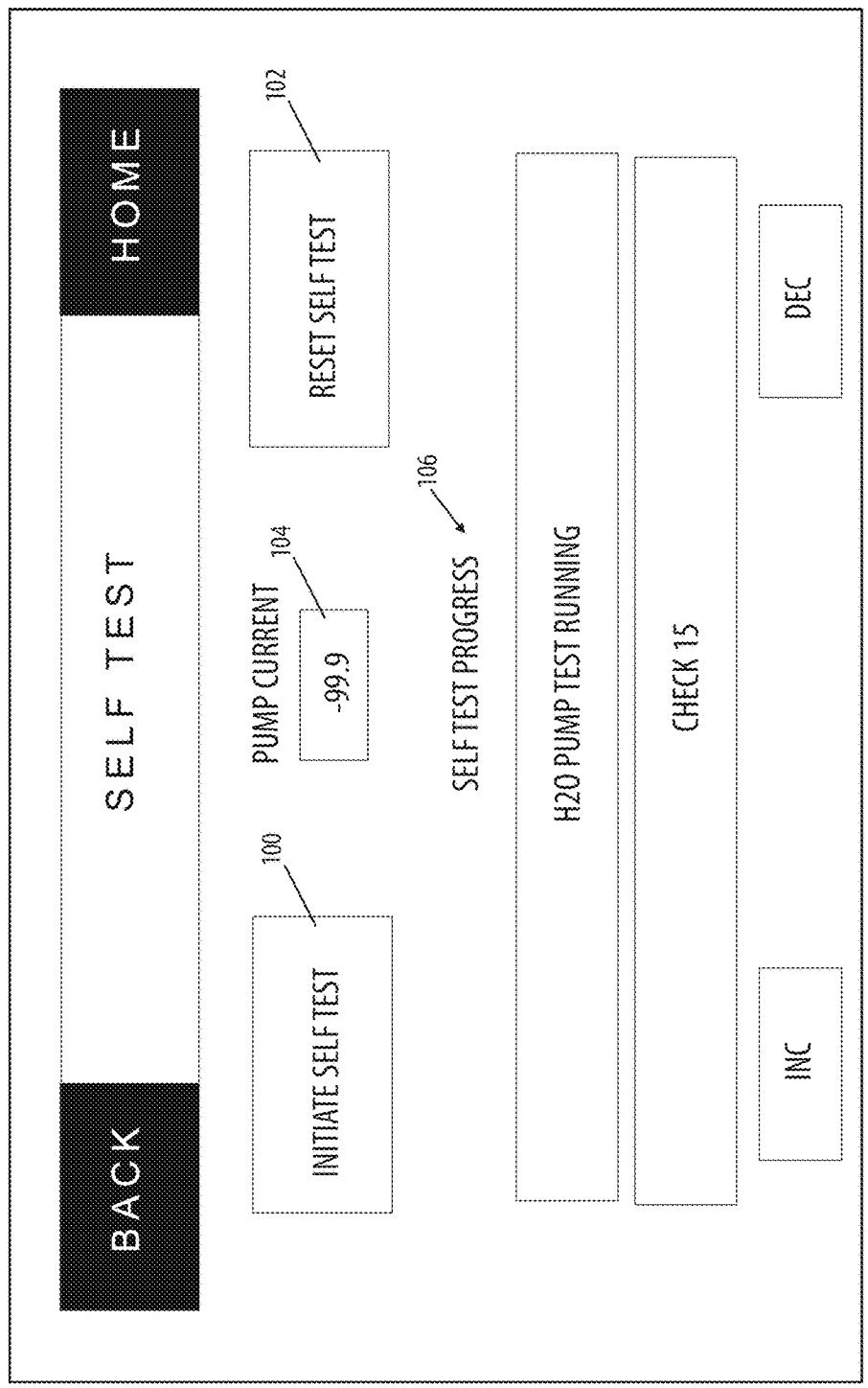
Figure 10:
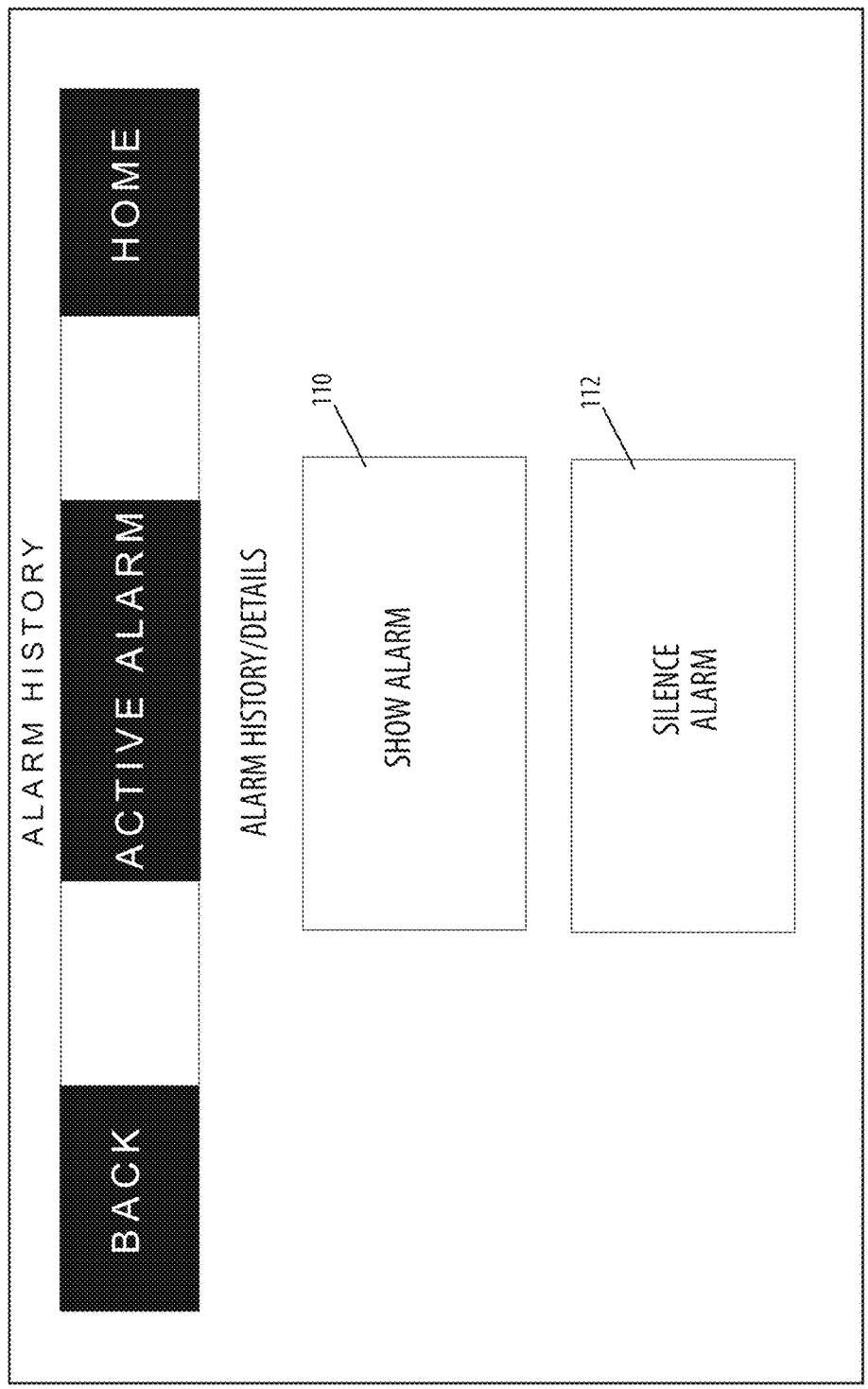
Figure 11:
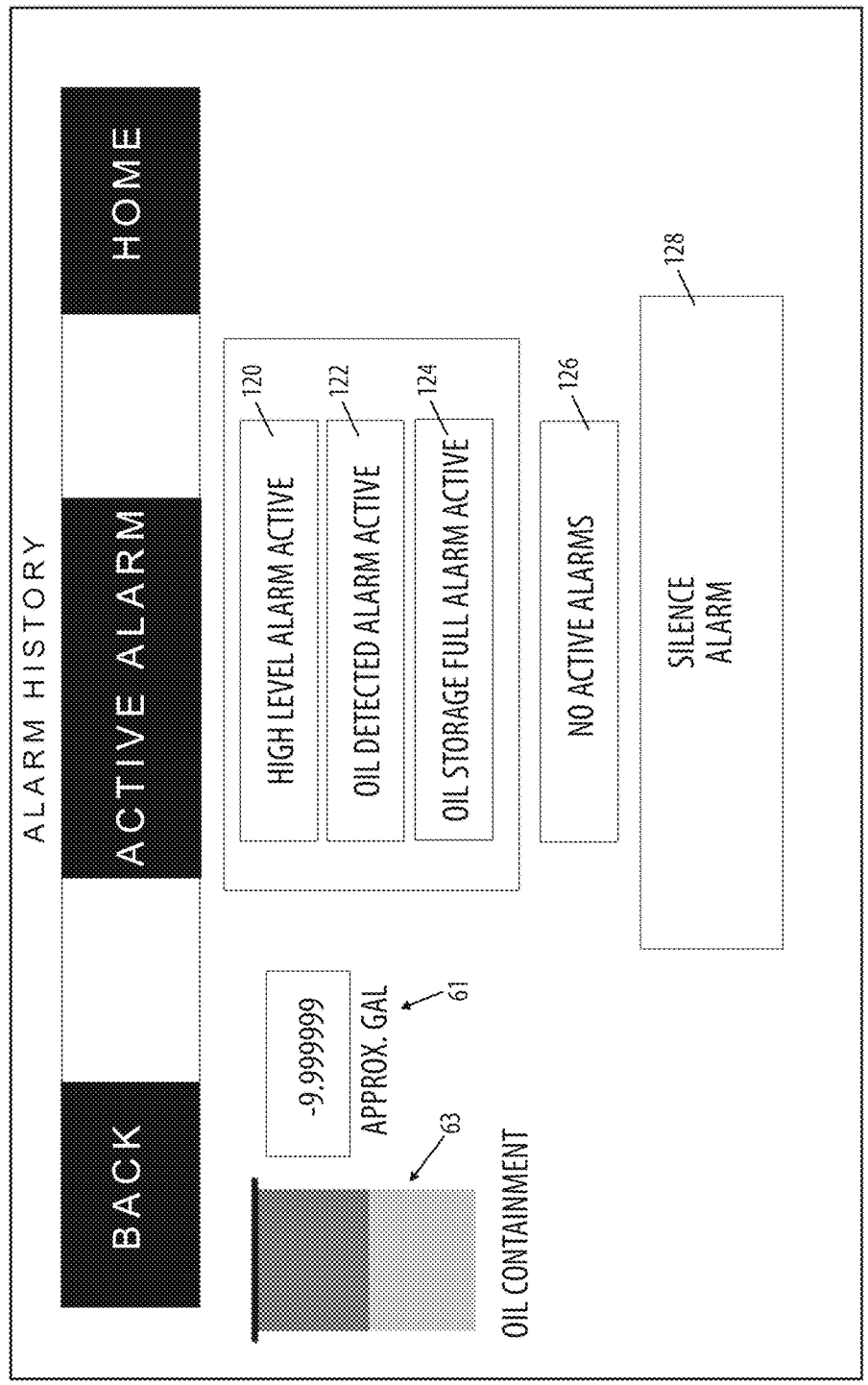
Figure 12:
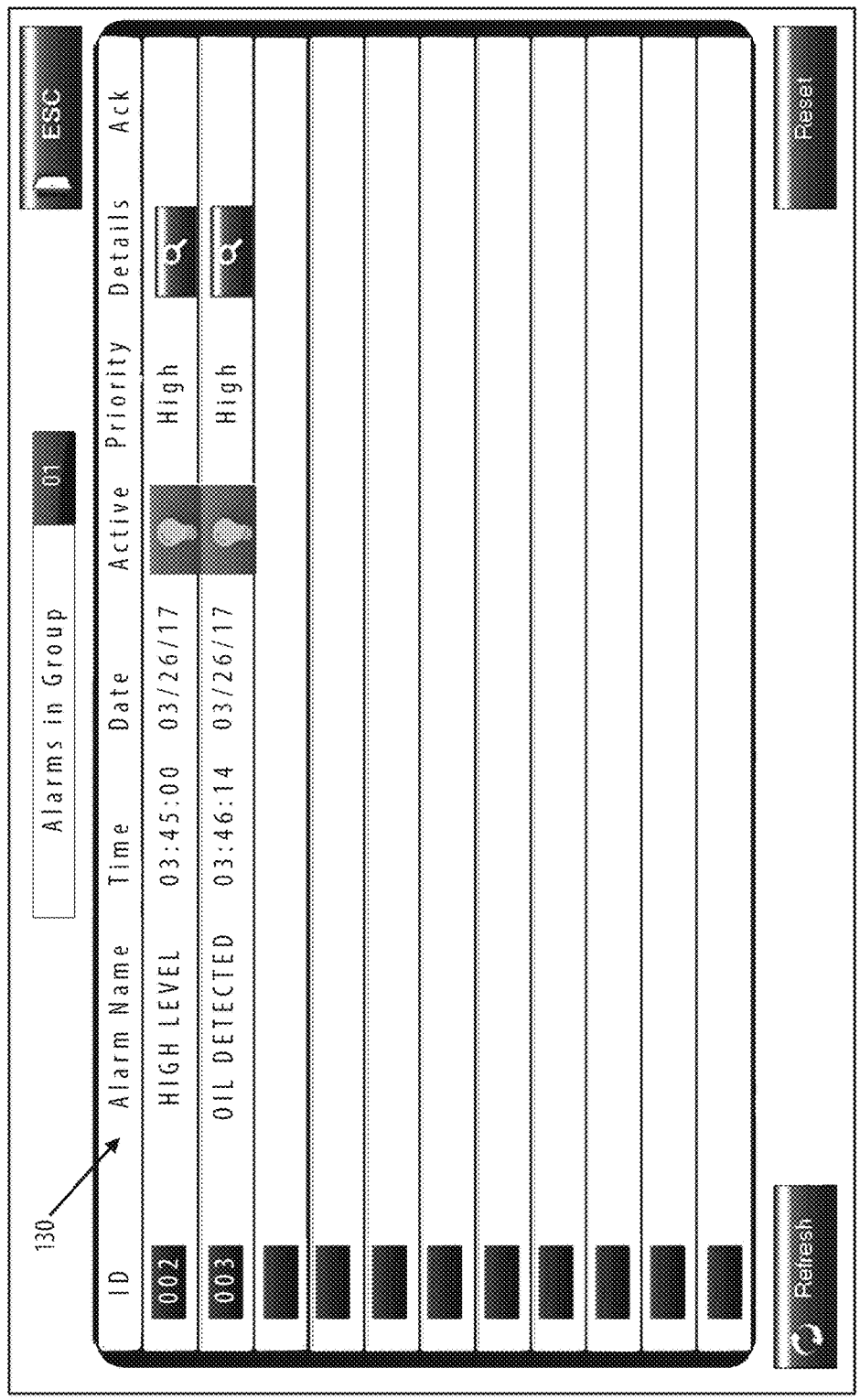
Figure 13:
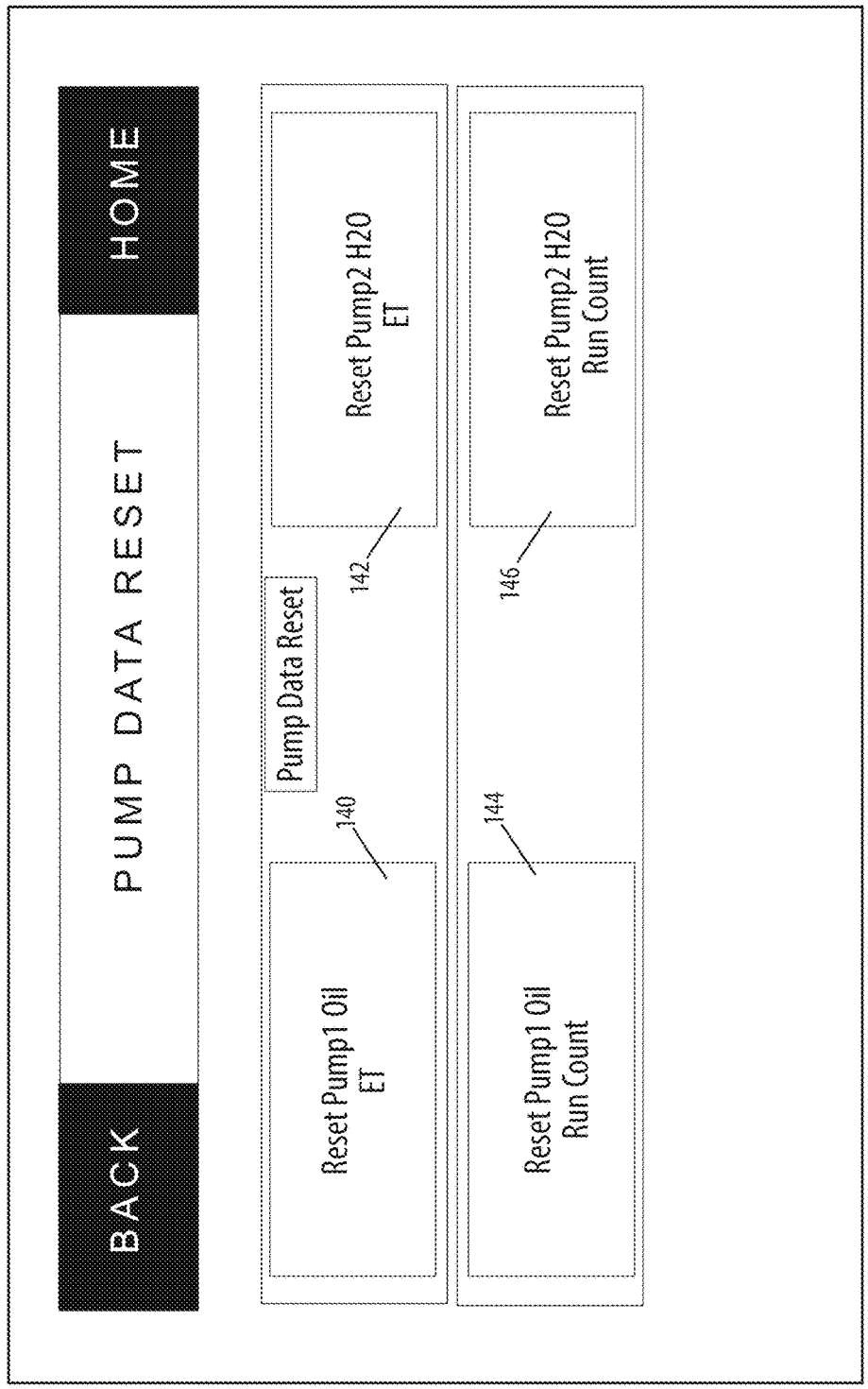

3) Pump run count 54, which when selected renders a screen which monitors how many times the water and hydrocarbon pumps have been engaged. FIG. 8 is an example screenshot of the main controller touch screen 26 showing pump run count data 90, 92 for the hydrocarbon pump 28 and the water pump 30, respectively;

4) Self-test 56, which when selected enables initiation of the self-test procedure described herein and also renders a page which indicates the status of a current step of the self-test. Failure indicators and trouble shooting codes in the event of a failed condition are also provided, which are particular to each step. Access to a stored electronic reference guide for looking up indicated trouble shooting codes may be provided as well, and/or a paper troubleshooting guide may be provided. FIG. 9 is an example screenshot of the main controller touch screen 26 showing an example embodiment of a self-test menu, including a self-test initiation option 100, self-test reset option 102, pump current monitor 104, and a self-test progress monitor 106 showing the current step of the test;

5) Alarm history 58, which when selected renders a page which provides a visual indicator that tracks alarm history, including, but not limited to, data for each alarm and how often alarms were activated. FIG. 10 is an example screenshot of the main controller touch screen 26 showing an alarm menu for accessing alarm history 110 and an option to silence active alarms 112;

6) Active alarms 60, which when selected renders a page which provides a visual indicator of active alarms (which are separate from the self-test steps mentioned above). The indicators may comprise, for example, audible/visual alarms, text messages, e-mail messages, or combinations thereof. FIG. 11 is an example screenshot of the main controller touch screen 26 showing active alarms, including but not limited to high level alarm 120, hydrocarbon detected alarm 122, and hydrocarbon storage full alarm 124. An indicator 126 may be provided to readily show when no alarms are active. An option 128 to silence all active alarms may be provided. A representation 63 and fill level indicator 61 for the fill level of the storage tank 36 may also be provided on this page, as described in connection with FIG. 5;

7) Alarms 59, which when selected may provide a user with various options for viewing alarm history associated with various system components, including self-test alarm history and silencing the audible alarm. For example, this page may enable the user to select between Alarm History (FIG. 10) and Active Alarms (FIG. 11);

8) Date & time 62, which when selected renders a page which indicates the date and time alarms were activated. FIG. 12 is an example screenshot of the main controller touch screen 26 showing alarm details 130 including date and time;

9) Pump data reset 64 which when selected renders a page which allows users to reset pump data (e.g. elapsed hour meters, pump cycle counters, etc.), which may be used to determine when to trigger or schedule the self-test functionality. FIG. 13 is an example screenshot of the main controller touch screen showing pump data reset options, including a reset elapsed pump run time options 140 and 142 for each pump 28, 30, and reset pump run count options 144, 146 for each pump 28, 30.

Figure 14:
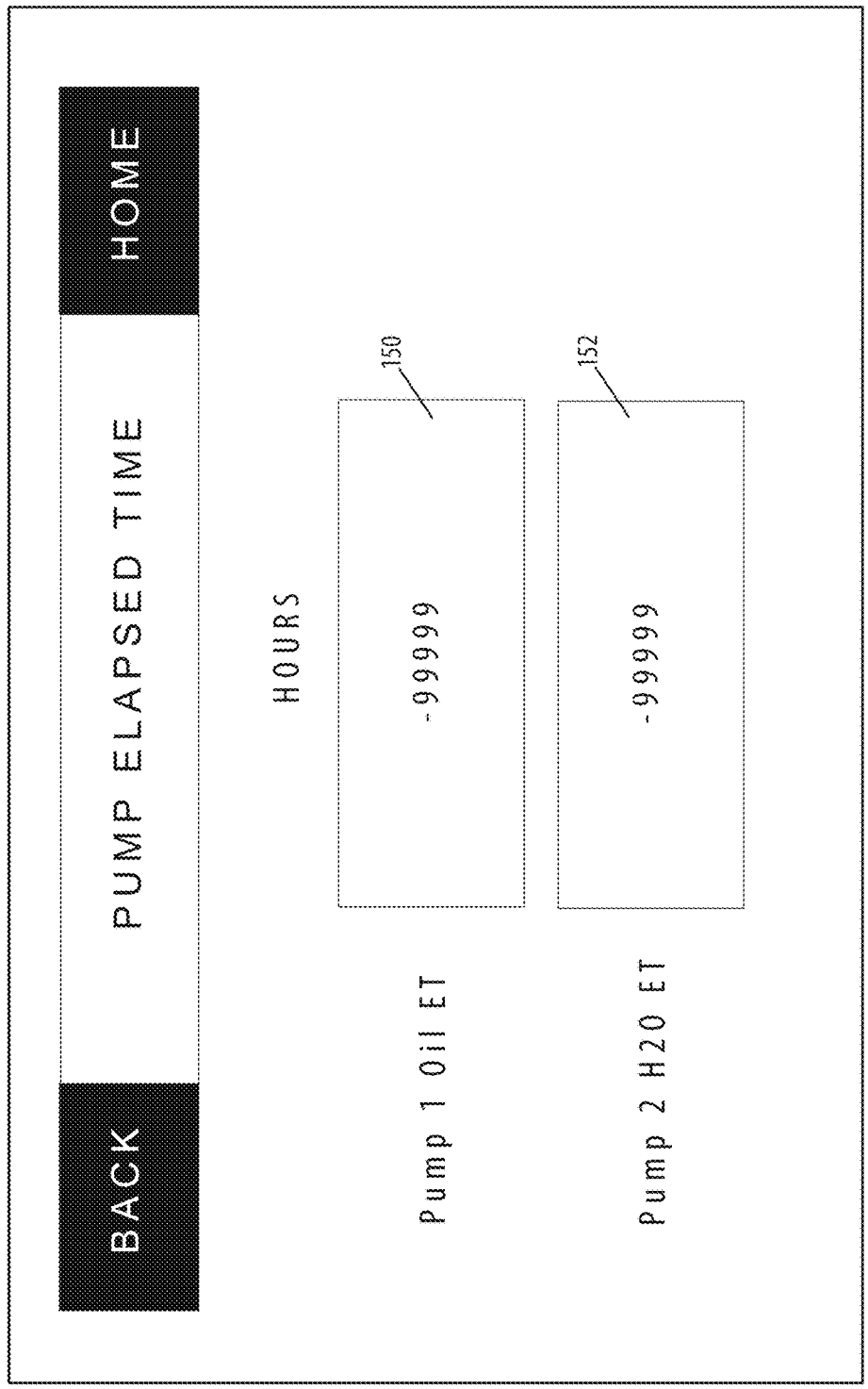

10) Pump elapsed time 66, which when selected renders a page which shows monitors which indicate elapsed time usage of the water and hydrocarbon pumps (e.g., total pump running time in hours and minutes). FIG. 14 is an example screenshot of the main controller touch screen 26 showing pump elapsed time indicators 150, 152 for each pump 28, 30.

The main controller 24 may also comprise data logging and reporting capabilities for tracking and providing access to alarm history, self-test reports, preventative maintenance reports, and the like, including via direct connection to a computer, e-mail or texting.

It should also be appreciated that the main controller 24 can be configured to control multiple pump systems, for example in a building or complex that has multiple sumps 32. In such an embodiment, the home page of the touch screen 26 may include an option for selecting from among the multiple pump systems.

Although the present invention is described in connection with a dual pump system as shown in FIG. 1 (which includes a water pump and a hydrocarbon pump), it should be appreciated that the present invention can be applied to any type of dual-pump system. For example, the hydrocarbon pump may instead be adapted to pump any type of contaminant that separates from water and can be distinguished therefrom based on use of a probe or sensor. Further, the pumps may be adapted for use with any types of liquids that separate from one another. For cases where the both liquids are conductive or non-conductive, sensing or probe means other than conductivity probes may be employed.

Further, although the present invention is described in connection with a dual-pump system as shown in FIG. 1 for separately pumping conductive liquids such as water and non-conductive liquids such as hydrocarbons (or other liquids), the present invention can also be adapted for use with a single-pump system (a/k/a a simplex system), including standard residential or commercial sump pump systems where only a single fluid may (or should) be present, such as, for example, water. Such a system may employ a single pump, together with a stop and start probe, and one or more high level indicators (such as a float, a high water probe sensor, and optionally redundant floats and sensors). As one possible example, such a system may include all but the hydrocarbon pump of FIG. 1. An example embodiment of such a system is shown in FIG. 15. In such an example embodiment, the self-test will comprise the same steps described above, except for the running of the hydrocarbon pump (twice).

Referring to FIG. 15, one example of a self-test method for a simplex system may comprise:

remotely activating a pump 30 a first time to ensure operation;

remotely activating start and stop probes 10, 12 to determine continuity between an internal relay board 20 and a main controller 24;

remotely activating a high-level probe 14 to determine continuity between the internal relay board 20 and the main controller 24;

remotely checking circuitry of a primary float 16 to determine continuity between the primary float 16 and the main controller 24; and remotely checking circuitry of a redundant float 18 positioned above the primary float 16 to determine continuity between the redundant float 18 and the main controller 24.

The individual activating and checking steps for the simplex system may be carried out in the same manner as discussed above for the corresponding steps of the dual pump system of FIG. 1. Further, the main controller may provide the same functionality as discussed above, adapted to the single pump of the FIG. 15 embodiment.

In a simplex system, the pump is typically routed to the surface or to a standard water drain 34. Thus, prior to initiating the self-test, it is important to determine whether a non-conductive liquid (such as hydrocarbon or other non-conductive contaminant) is present at a bottom of the sump 32. Thus, once the self-test is initiated, a check may be run to determine whether any non-conductive liquid is present before activating the pump 30. Such a check may be carried out using a float 19 arranged near the bottom of the sump 32 and a conductivity probe 21. A redundant float 23 may be arranged above the float 19 for safety in the event the float 19 fails. This arrangement operates in the same manner as the high-level probe and main float 16 to determine the presence of a non-conductive liquid as discussed above in connection with FIG. 1: the presence of a non-conductive liquid will be detected when the liquid level is high enough to trip the float 19 (or trip the redundant float 23 if the float 19 fails) and the layer of non-conductive liquid is thick enough such that no conductivity is present between the pump's electrically conductive parts 44 and the conductivity probe 21. If the check determines that a non-conductive liquid is present, the self-test is aborted so that non-conductive liquids (e.g., hydrocarbon based liquids) are not pumped to the drain 34.

As discussed above, the main controller 24 includes status monitoring functions and indicated alarm conditions denoting problems with normal operation of the pump system. The main controller 24 will prevent initiation of the self-test if the pump(s) are in operation or if there is a current alarm condition indicated.

In any embodiment of the invention, a software application may be provided that may be downloaded and installed on a mobile or portable electronic device 40 (e.g., a smart phone, tablet computer, personal computer, laptop computer, or other Internet enabled user device). The software application, once installed, connects the portable electronic device(s) 40 to the main controller 24 and provides access to all the functionality enabled thereby, including controlling and monitoring of the self-test as well as controlling and monitoring of the pump system in normal operation. For example, the touch screen 26 of the main controller 24, or a modified version thereof, may be presented to a user on the screen of the portable electronic device 40. This enables the user to initiate the self-test remotely and provides status of the self-test steps. The application provides all the features of the main controller touch screen 26 discussed above on the portable electronic device 40, including, but not limited to, alarms, alarm indicators, troubleshooting codes, and a troubleshooting guide, as well as status of the system in normal operation. Alternatively, the software application may enable the portable electronic device 40 to communicate directly with the internal relay board 20 (or the remote monitor 22) of the pump system for initiating the self-test and status monitoring. Even when the software application enables such direct communication with the internal relay board 20 or remote monitor 22, the software application may in addition enable communications with the main controller 24, as well as data flow between the internal relay board 20 or remote monitor 22 and the main controller 24, such that any actions initiated via the portable electronic device 40 are also displayed or logged at the main controller 24.

The self-test of the present invention may be used by an installation contractor to test operation of the pump system after installation to ensure proper operation. Thus, the self-test enables a shift of liability to the contractor as the contractor is provided with the ability to ensure proper pump operation prior to signing off on the installation. The present invention may also be used by a home owner, building owner, or property manager subsequent to system installation to remotely monitor pump systems and initiate periodic self-tests thereof.

The self-test may be initiated by a user from the main controller 24 or via the portable electronic device 40 with the software application installed. The self-test may also be set to run at certain future dates and times, or set to run periodically (e.g., every x number of days, after y pump runtime hours, or the like).

The main controller 24 may allow for access and transfer via a network 42 and through an external device 40 such as laptop or tablet (including but not limited to other portable Internet enabled devices) of all the data contained within the main controller 24. The main controller 24 may also include an external port allowing for uploading of the data to an SD card or similar device.

It should now be appreciated that the present invention provides advantageous methods and systems for self-testing of pump systems.

Although the invention has been described in connection with various illustrated embodiments, numerous modifications and adaptations may be made thereto without departing from the spirit and scope of the invention as set forth in the claims.

What is claimed is:

1. A self-test method for remote testing of a sump pump system, comprising:
   remotely activating a first pump a first time to ensure the first pump is operational;
   remotely activating start and stop probes to determine continuity between an internal relay board and a main controller;
   remotely activating a high-level probe to determine continuity between the internal relay board and the main controller;
   remotely checking circuitry of a primary float to determine continuity between the primary float and the main controller;
   remotely checking circuitry of a redundant float positioned above the primary float to determine continuity between the redundant float and the main controller;
   remotely activating the first pump a second time to ensure it is safe to activate a second pump; and
   remotely activating the second pump to assure the second pump is operational.

2. A method in accordance with claim 1, wherein, during normal operation of the pump system:
   the start and stop probes control operation of the second pump; and
   the high-level probe in connection with the primary float or the redundant float enable a determination of a presence of a non-conductive liquid for initiating operation of the first pump during normal operation.

3. A method in accordance with claim 1, further comprising:
   prior to initiating the self-test, checking whether the pump system is currently in normal operation or in an alarm state; and
   if the pump system is currently in normal operation or in an alarm state, aborting the self-test or delaying the self-test until the pump system is no longer in normal operation or in the alarm state.

4. A method in accordance with claim 1, wherein the first pump is for pumping non-conductive fluids and the second pump is for pumping conductive fluids.

5. A method in accordance with claim 4, wherein the non-conductive fluids comprise at least one of a hydrocarbon based fluid, a hydraulic fluid, oil, gas, and diesel fuel.

6. A method in accordance with claim 1, wherein the first pump is routed to a containment chamber and the second pump is routed to a surface drain.

7. A method in accordance with claim 1, wherein the start probe, the stop probe, and the high-level probe each comprise a conductivity probe.

8. A method in accordance with claim 1, wherein when the first pump is activated the first time or the second time, any liquid present in the sump is pumped to an external storage container.

9. A method in accordance with claim 8, wherein a liquid level of the external storage container is monitored and an alert is issued once the liquid level reaches a predetermined level.

10. A method in accordance with claim 9, wherein:
    the first pump will not be activated in the event that the liquid level of the external storage container is at the predetermined level; and
    the first pump will be shut off if the predetermined level is reached during activation of the first pump.

11. A method in accordance with claim 1, wherein the first pump is run until at least one of a dry running condition is sensed via a current sensor and a predetermined time period has elapsed.

12. A method in accordance with claim 1, wherein:
    the start probe, the stop probe, and the high-level probe are each activated by closing corresponding relays resulting in a generation of a corresponding signal;
    the corresponding signal is sent to the main controller; and
    in the event that the corresponding signal does not reach the main controller or predetermined signal conditions for the corresponding signal are not met, the self-test is aborted.

13. A method in accordance with claim 1, wherein:
    in an unactivated state, corresponding contacts in the circuitry of the primary float and in the circuitry of the redundant float are in the closed position;
    the circuitry of the primary float and the circuitry of the redundant float are each checked by sending a signal through the corresponding contacts resulting in generation of a corresponding signal;
    the corresponding signal is sent to the main controller; and
    in the event that the corresponding signal does not reach the main controller or predetermined signal conditions for the corresponding signal are not met, the self-test is aborted.

14. A method in accordance with claim 1, wherein when the second pump is activated, the second pump is run until at least one of a dry running condition is sensed via a current sensor and a predetermined time period has elapsed.

15. A method in accordance with claim 1, wherein:
    the second pump is run until a dry running condition is sensed; and
    due to the activation of the first pump the first and second times, in the event that a dry running condition is not immediately sensed, the second pump is shut off and an alert is generated.

16. A method in accordance with claim 1, wherein:
    a remote monitor is provided which comprises the internal relay board, the circuitry for the primary float, the circuitry for the redundant float, and circuitry for the start probe, the stop probe, and the high-level probe;
    each of the activating or checking steps, if completed within acceptable parameters, results in a corresponding handshake between the remote monitor and the main controller; and
    the self-test is aborted and an alert is generated in the event that any of the activating or checking steps does not result in the corresponding handshake.

17. A method in accordance with claim 16, wherein:
    the remote monitor is located within the sump or adjacent to the sump;
    the main controller is located at a location remote from the sump; and
    the remote monitor is in wired or wireless communication with the main controller.

18. A method in accordance with claim 1, wherein the self-test is initiated via a user interface of the main controller or a user interface generated by a mobile application running on a portable user device which enables communication between the main controller and the portable user device.

19. A method in accordance with claim 18, wherein the user interface enables control and monitoring of the self-test and control and monitoring of normal pump system operation.

20. A method in accordance with claim 18, wherein the user interface comprises a touch screen display comprising one or more of the following menu items or displays:
   pump status;
   pump controls;
   pump run count;
   pump data;
   pump elapsed time;
   oil containment status;
   oil containment configuration;
   self-test;
   alarm history;
   active alarms; and
   real-time pump current values.

21. A method in accordance with claim 1, wherein the self-test is initiated at one of predetermined intervals or one or more scheduled dates and times.

22. A method in accordance with claim 21, wherein the predetermined intervals comprise one of a predetermined time interval or a predetermined number of pump runtime hours.

23. A system for remote self-testing of a sump pump system, comprising:
   a main controller for the pump system;
   a remote monitor in or adjacent to the sump in communication with the main controller, the remote monitor comprising an internal relay board and circuitry for pump system components;
   a user interface for the main controller for operating the pump system and initiating execution of software for carrying out a self-test of the pump system, the self-test comprising;
   remotely activating a first pump a first time to ensure the first pump is operational;
   remotely activating start and stop probes to determine continuity between the internal relay board and the main controller;
   remotely activating a high-level probe to determine continuity between the internal relay board and the main controller;
   remotely checking circuitry of a primary float to determine continuity between the primary float and the main controller;
   remotely checking circuitry of a redundant float positioned above the primary float to determine continuity between the redundant float and the main controller;
   remotely activating the first pump a second time to ensure it is safe to activate a second pump; and
   remotely activating the second pump to assure the second pump is operational.

24. A self-test method for remote testing of a sump pump system, comprising:
   remotely activating a pump a first time to ensure operation;
   remotely activating start and stop probes to determine continuity between an internal relay board and a main controller;
   remotely activating a high-level probe to determine continuity between the internal relay board and the main controller;
   remotely checking circuitry of a primary float to determine continuity between the primary float and the main controller; and
   remotely checking circuitry of a redundant float positioned above the primary float to determine continuity between the redundant float and the main controller;
wherein:
   prior to initiating the self-test, it is determined whether a non-conductive liquid is present at a bottom of the sump; and
   if non-conductive liquid is determined to be present, aborting the self-test.

* * * * *